United States Patent [19]

Homan

[11] Patent Number: 5,234,268
[45] Date of Patent: Aug. 10, 1993

[54] CLEANING SOLUTION MIXING AND METERING PROCESS

[75] Inventor: George F. Homan, Kettering, Ohio

[73] Assignee: ChemStation International, Inc., Dayton, Ohio

[21] Appl. No.: 1,336

[22] Filed: Jan. 7, 1993

Related U.S. Application Data

[60] Continuation of Ser. No. 339,303, Apr. 12, 1989, abandoned, which is a division of Ser. No. 137,188, Dec. 23, 1987, Pat. No. 5,020,917.

[51] Int. Cl.⁵ .......................................... G05D 11/00
[52] U.S. Cl. .................................. 366/161; 137/567; 222/134; 222/135; 222/144.5; 366/177
[58] Field of Search .............................. 366/160–162, 366/177, 336; 134/100; 137/351, 567; 222/134, 135, 144.5, 148; 239/172

[56] References Cited

U.S. PATENT DOCUMENTS

| | | |
|---|---|---|
| 2,955,726 | 10/1960 | Feldman et al. . |
| 2,980,295 | 4/1961 | Sacco ........................... 222/144.5 X |
| 3,094,998 | 6/1963 | Gley . |
| 3,348,744 | 10/1967 | Wiggins . |
| 3,638,837 | 2/1972 | Fullerton . |
| 3,797,744 | 3/1974 | Smith . |
| 3,865,308 | 2/1975 | Pringle et al. . |
| 3,976,087 | 8/1976 | Bolton et al. ...................... 137/351 X |
| 3,993,219 | 11/1976 | Franzosi . |
| 4,063,663 | 12/1977 | Larson et al. . |
| 4,213,796 | 7/1980 | Shaffer .............................. 137/351 X |
| 4,245,785 | 1/1981 | Johansing . |
| 4,337,282 | 6/1982 | Springer . |
| 4,390,035 | 6/1983 | Hill . |
| 4,392,508 | 7/1983 | Switall . |
| 4,426,362 | 1/1984 | Copeland . |
| 4,440,314 | 4/1984 | Vetter et al. ..................... 222/135 X |
| 4,485,840 | 12/1984 | Erwin . |
| 4,524,801 | 6/1985 | Magnasco et al. . |
| 4,553,573 | 11/1985 | McGarrah . |
| 4,554,939 | 11/1985 | Kern et al. . |
| 4,565,511 | 1/1986 | Ramisch . |
| 4,580,699 | 4/1986 | Black et al. ..................... 222/135 X |
| 4,651,907 | 3/1987 | Thomas . |

FOREIGN PATENT DOCUMENTS 2081397  2/1982  United Kingdom ................ 366/177

Primary Examiner—Stephen F. Gerrity
Attorney, Agent, or Firm—Killworth, Gottman, Hagan & Schaeff

[57] ABSTRACT

Disclosed is a cleaning solution delivery system for mixing and metering cleaning solution from liquid bulk storage containers of liquid cleaning concentrate. The mixing and metering station includes a first set of hydraulic cylinders each of which is connected to one of a plurality of liquid bulk storage containers containing liquid cleaning concentrate, a second hydraulic cylinder connected to a source of water, and a third set of hydraulic cylinders each of which is connected to one of a plurality of liquid chemical additive tanks. Various cleaning solution formulas can be mixed with this system and metered through a single delivery hose. The mixing and metering station may be used at a variety of locations to ultimately provide cleaning solution to on-site individual usage dispensers.

12 Claims, 4 Drawing Sheets

CLEANING SOLUTION MIXING AND METERING PROCESS

CROSS-REFERENCE TO RELATED APPLICATIONS

This is a continuation of application Ser. No. 07/339,303, filed Apr. 12, 1989, now abandoned as a division of application Ser. No. 137,188, filed Dec. 23, 1987, now U.S. Pat. No. 5,020,917.

BACKGROUND OF THE INVENTION

The present invention relates to a system for mixing and metering cleaning solutions. More particularly it relates to a delivery system for mixing and metering cleaning solutions from liquid bulk concentrate storage containers into on-site individual usage dispensers.

As is known, industrial plants, institutions such as restaurants, hospitals and hotels and other commercial manufacturing and processing facilities require continuous maintenance and cleaning. For this reason, Smith in U.S. Pat. No. 3,797,744 suggests a portable cleaning and sanitizing system for use in such facilities. Smith's portable system includes a wheeled frame supporting a series of chemical tanks connected to a manifold, a water inlet, and a high pressure pump. The result is a cleaning and sanitation unit issuing high or low pressure streams of fluid arranged to permit a single worker to quickly and effectively clean and sanitize food processing work areas without manual scrubbing and without leaving the immediate vicinity of the unit. Still, the chemical tanks of Smith must be frequently replaced or refilled with cleaning solution.

Likewise, many institutions provide a source of cleaning solution, such as a 5 gallon pail-type dispenser or a 55 gallon drum-type dispenser, so that workers can wash their hands and/or equipment during the working day. Again, it is necessary to frequently refill such dispensers with cleaning solution.

There are, of course, many systems for delivering bulk chemicals of one type or another to dispensers of one type or another. For example, McGarrah in U.S. Pat. No. 4,553,573 discloses a bulk syrup delivery system in which a compartmentized tank delivery truck includes a plurality of separate compartments, generally one for each of several different types of soft drink syrup. A multi-channel delivery hose is used to deliver syrup from the truck to account storage tanks.

There are also numerous mixing and metering systems for mixing bulk chemicals with a solvent such as water and then dispensing predetermined amounts of the mixed material. For example, Hill U.S. Pat. No. 4,390,035 discloses mixing agriculture chemicals in preselected amounts of water in a liquid spraying system; Wiggens U.S. Pat. No. 3,348,774 and Springer U.S. Pat. No. 4,337,282 disclose mixing paint with a solvent in a color change system for paint spraying installations; Jehansing U.S. Pat. No. 4,245,785 discloses mixing liquid asphalt with a solvent to form a sprayable emulsion, and Eransosi U.S. Pat. No. 3,993,219 discloses mixing liquid pharmaceuticals in a continuous mixing and metering system.

In the area of cleaning solutions, U.S. Pat. No. 4,063,663 and 4,426,362 disclose a system for combining water or any other solvent and powdered or block detergent from a cleaning chemical dispenser to produce a liquid cleaning solution which is directed to a utilization point which can be a ware-washing sink or the like. Related U.S. Pat. No. 4,651,907 discloses a hydraulic timer valve for use in that system.

Finally, with regard to cleaning solutions it is also known to use a portable dispensing system using different lines to transfer a variety of cleaning solutions from a bulk source to individual holding tanks. However, that system requires the use of multiple hose reels, which is cumbersome and inefficient.

Accordingly, the need exists for an improved mixing and metering system for delivering cleaning solutions from liquid bulk concentrate storage containers to on-site individual usage dispensers.

SUMMARY OF THE INVENTION

That need is met by the present invention which provides a simple and efficient system for mixing and metering cleaning solution 15 from liquid bulk concentrate storage containers into on-site individual usage dispensers. Unlike the systems used in the past, the present one is simple in that it does not use multiple hose reels or hoses, but rather uses only a single hose reel and/or hose through which a variety of cleaning solution formulas may be conveyed. Even though the present system is more simple in that regard, in other respects it is infinitely more sophisticated in that a variety of liquid cleaning concentrate materials and liquid chemical additives can be mixed in a variety of different formulas and amounts.

The mixing and metering station of the present invention may be used with liquid bulk storage containers at a formulation site to prepare cleaning solutions which are placed in a transfer vessel, transported to the site of use, and, then, transferred to the on-site individual usage dispensers. Alternatively, it may be used at the industrial or institutional site. In that instance, the liquid bulk storage containers would be delivered to the site, such as in the form of compartmentized tank trucks, and connected to the mixing and metering station of the present invention. As a third option, the mixing and metering station and the liquid bulk storage containers may both be made portable. Thus, the mixing and metering station of the present invention is particularly adapted to be placed on a delivery truck which also carries multiple liquid bulk storage containers, liquid chemical additive tanks, and optionally a single hose reel. By then 10 attaching a water hose from an external water source and activating the system, cleaning solution of the prescribed type can be conveyed in the desired quantity to individual usage dispensers, such as 55 gallon drum-type containers having a dispenser affixed thereto, which are located at the site. In any of these ways the mixing and metering system of the present invention permits easy and economic refilling of those dispensers.

The particular cleaning solution used at any one site may differ from that used at another depending on the type of cleansing or sanitation need existent in that institution or industry. For this reason it is desirable to use a plurality of liquid bulk storage containers containing different liquid cleaning concentrates such as surfactants, detergent builders, water soluble solvents, and stabilizers. The mixing and metering station, then, has a first set of hydraulic cylinders in fluid communication therewith. Each of the hydraulic cylinders is connected to a different liquid bulk storage container. By using a separate potentiometer and solenoid operated flow control valve with each hydraulic cylinder, it is possible to control the amount of liquid cleaning concentrate material conveyed from each liquid bulk storage container to an outlet pipe. By using a similar potentiometer/flow control valve arrangement with a second hydraulic cylinder which is in fluid communication with a water inlet connected to a source of water it is possible to control the amount of water conveyed to the outlet pipe. In this manner predetermined amounts of various liquid cleaning concentrates and water are joined in the outlet pipe where they are mixed, preferably by a mixer, such as a Chemical Static Mixer stationary mixing tube, associated with the outlet pipe.

Preferably a third set of hydraulic cylinders is present on the mixing and metering station. Each hydraulic cylinder in that third set is in fluid communication with one of a plurality of liquid chemical additive tanks. For example, one liquid chemical additive tank may contain perfume, and another may contain dye. Flow control valves connected to each hydraulic cylinder in this third set can be used to adjust the flow of each chemical additive to the outlet pipe so that predetermined amounts of liquid chemical additive are also mixed into the cleaning solution.

The liquid pumping portions of the hydraulic cylinders may have a unique dual feed/multiple check valve arrangement which permits initial feed of the liquid cleaning concentrate and water into the bottom of the cylinder and continuous pumping of liquid chemical concentrate and water thereafter. This arrangement eliminates problems of air entrapment often found in hydraulic cylinder pumping systems.

All of the hydraulic fluid portions of the hydraulic cylinders on the mixing and metering station are in fluid connection with a pump which is also a part of the mixing and metering station. In turn, the pump is driven by a motor, such as an electric motor, which is also present on the self-contained, portable, mixing and metering station.

All of the hydraulic cylinders on the mixing and metering station also have a quick connect coupling for easy connection to and disconnection from the water source, the liquid bulk storage containers and the liquid chemical additive tanks.

The present system thus provides not only simple and efficient mixing and metering of cleaning solution, but it also provides for versatility. A variety of cleaning solutions can be supplied from a single outlet pipe connected to a single delivery hose. Likewise, the mixing and metering station of the present invention may be placed on a delivery truck or used apart from it.

Accordingly, it is an object of the present invention to provide an improved system for mixing and metering cleaning solutions and to provide a mixing and metering station for use in that system.

Other objects and advantages of the invention will be apparent from the following description, the accompanying drawings and the appended claims.

DETAILED DESCRIPTION OF THE PREFERRED EMBODIMENTS

Figure 1:
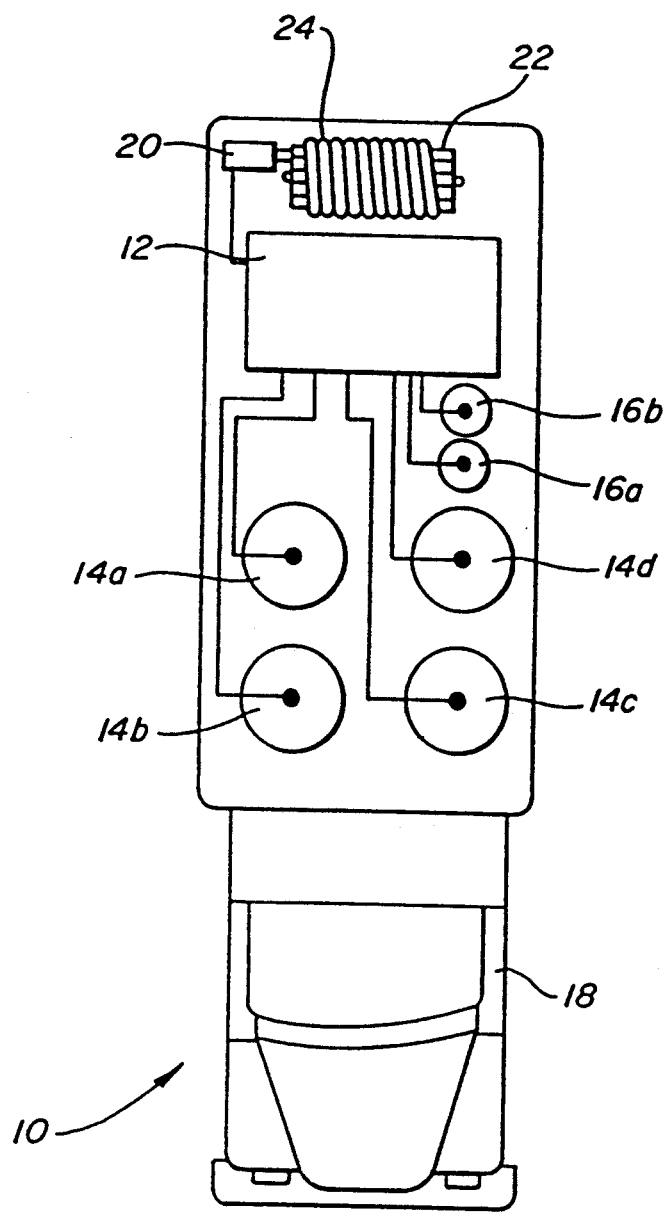
FIG. 1 is a top view schematically showing an embodiment of the mixing and metering system of the present invention in that the mixing and metering station of the present invention is located on a delivery truck.

Referring to FIG. 1, there is shown a cleaning solution delivery system 10 which includes a mixing and metering station 12, a plurality of liquid bulk storage containers 14a-14d, and a plurality of liquid chemical additive tanks 16a-16b on delivery truck 18. Also shown, but optional, is a delivery hose 24 on hose reel 22, and coupling/switch 20 for coupling the cleaning solution output line from mixing and metering station 12 to delivery hose 24 and activating the unwinding of delivery hose 24 from hose reel 22. As mentioned, use of a hose reel and the arrangement shown is totally optional. It may, in fact, be more preferable to simply carry elsewhere on the delivery truck a loose delivery hose which may be manually coupled to the cleaning solution output line from mixing and metering station 12 at the time of delivery of cleaning solution to the on-site individual usage dispensers.

Figure 4:
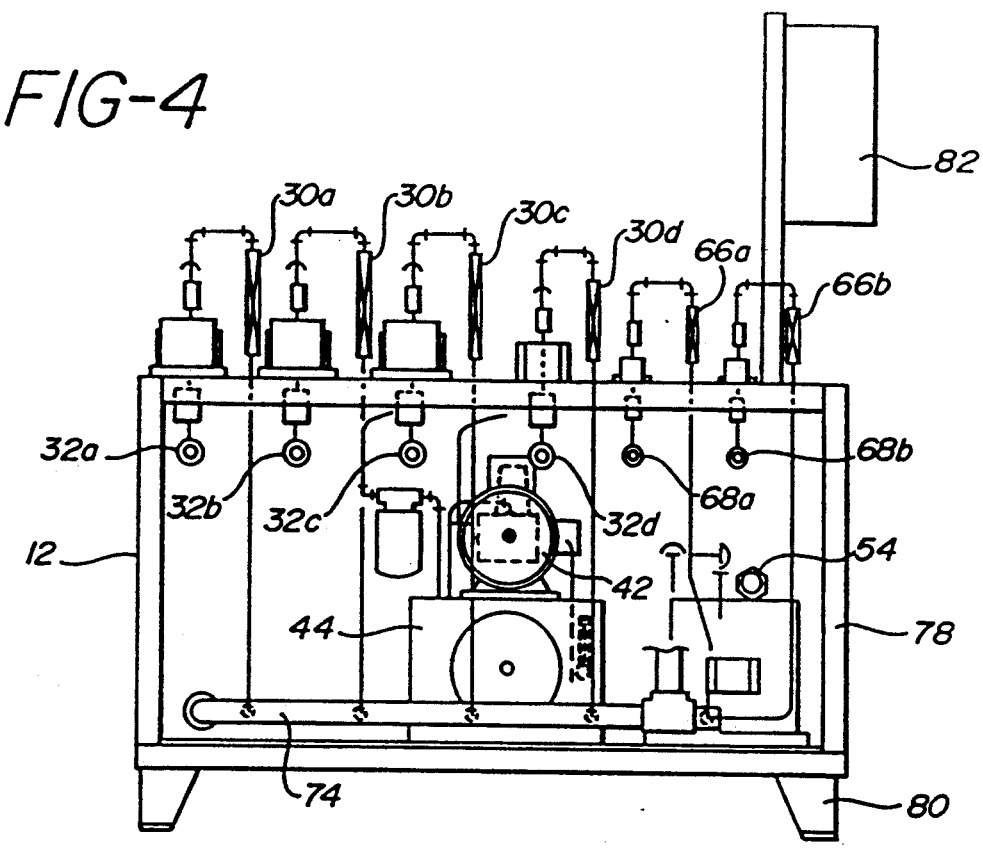
FIG. 4 is a rear view of the mixing and metering station of the present invention.
Figure 5:
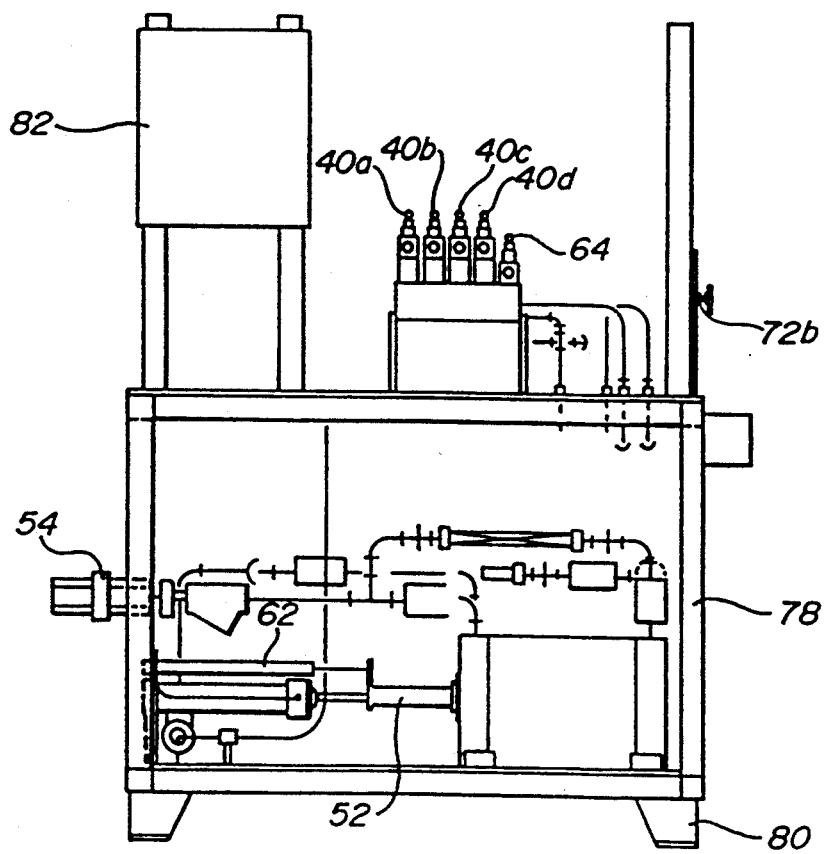
FIG. 5 is another partial side view of the mixing and metering station of the present invention.
Figure 6:
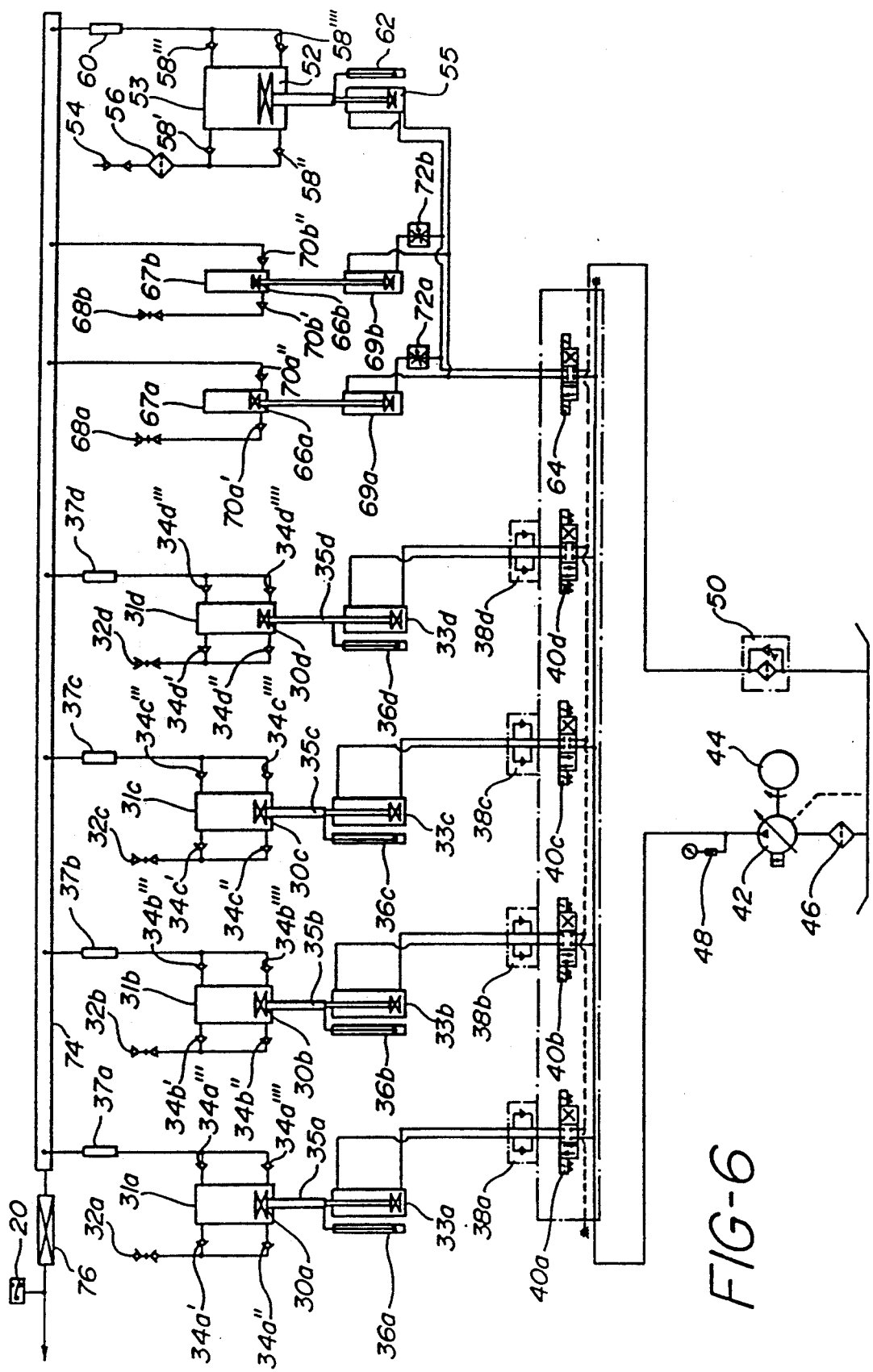
FIG. 6 is a schematic diagram of the operative elements of the mixing and metering station of the present invention.

Mixing and metering station 12 is more fully shown in FIGS. 2-5 and its operative elements schematically illustrated in FIG. 6. Common reference numerals for common elements have been used in FIGS. 2-6. As shown principally in FIG. 6 there are four hydraulic cylinders 30a-30d in the first set of hydraulic cylinders. The hydraulic cylinders have liquid pumping portions 31a-31d, and hydraulic fluid portions 33a-33d connected by connecting rods 35a-35d. Hydraulic cylinders 30a, 30b, 30c and 30d have quick connect couplings 32a, 32b, 32c, and 32d, respectively, which may be Hansen 1" Quick Disconnect Couplings, for connecting thereto a hose or pipe for fluid communication with liquid bulk storage tanks 14a, 14b, 14c, and 14d (as shown in FIG. 1), respectively. Fewer or more bulk storage containers may be used. A corresponding number of hydraulic cylinders will be required in the first set. In any event, each hydraulic cylinder in the first set of hydraulic cylinders also has a series of check valves 34a'-34a", 34b'-34b", 34c'-34c", and 34d'-34d" at the liquid cleaning concentrate inlets which may be a 1" O.D.×0.035 tubing and 34a'''-34a'''', 34b'''-34b'''', 34c'''-34c'''', and 34d'''-34d'''' at the liquid cleaning concentrate outlets which may be a ⅜" O.D.×0.035 tubing. The check valves and liquid cleaning concentrate inlets are arranged so that the liquid cleaning concentrate is initially fed through check valves 34a", 34b", 34c", and 34d" into the bottom of liquid pumping portion 31a, 31b, 31c, and 31d of hydraulic cylinders 30a-30d. After initial feed, the liquid cleaning concentrate exits through check valves 34a''', 34b''', 34c''', and 34d''', then, in through check valves 34a', 34b', 34c', 34d', then, and out through 34a'''', 34b'''', 34c'''', and 34'''', etc. This results in continuous pumping of the liquid cleaning concentrate with minimal air entrapment. Clear sight tubes 37a-37d may be used to visually monitor the flow of liquid cleaning concentrate.

The hydraulic cylinders 30a-30d in the first set of hydraulic cylinders are controlled by potentiometers 36a-36d and flow control valves 38a-38d operated by electronic solenoids 40a-40d. That is, hydraulic fluid from an oil reservoir (not shown) is pumped by pump 42, such as a Racine 7.5 GPM pump, driven by motor 44, such as a 3 horse power, 1800 RPM electric motor, through suction strainer 46, to hydraulic fluid portions 33a-33d of the hydraulic cylinders. Hydraulic gauge 48 monitors the hydraulic pressure which may be set at 500 psi. Return flow for the hydraulic fluid as shown on FIG. 6 is through return filter 50.

The second hydraulic cylinder 52 has a quick connect coupling 54, which may be a Hansen 1 ¼" Quick Disconnect Coupling, at the water inlet, which may be a 1 ¼" galvanized pipe, followed by a water strainer 56. A hose (not shown) may be used to connect the water inlet to a remote water source. Again check valves 58'-58'''' are present at the water inlet and the water outlet, which may also be a 1 ¼" galvanized pipe, from the pumping portion 53 of second hydraulic cylinder 52 as shown in FIG. 6. The feed of water to and from pumping portion 53 of hydraulic cylinder 52 is similar to the feed of liquid cleaning concentrate to and from hydraulic cylinders 30a-30d as described above. As also shown is a clear sight tube 60 which may be used to visually confirm that the water flow is proper. The hydraulic fluid portion 55 of hydraulic cylinder 52 is controlled by means of potentiometer 62 and electronic solenoid 64.

In the third set of hydraulic cylinders is hydraulic cylinders 66a and 66b. There are quick connect couplings 68a and 68b, which may be Hansen ¾" Quick Disconnect Couplings, for connecting thereto a hose or pipe for fluid communication with liquid chemical additive tanks 16a and 16b (as shown on FIG. 1). One chemical additive tank may be used for perfume and another for dye. Additional liquid chemical additive tanks may be included and additional hydraulic cylinders added to the third set if so desired. For example, it may be desirable to have three liquid chemical additive tanks, one each for perfume, dye, and disinfectant. The pumping portions 67a-67b of hydraulic cylinders 66a and 66b have check valves 70a'-70a" and 70b'-70b", at the liquid chemical additive inlet and liquid chemical additive outlet and the hydraulic fluid portions 69a-69b are controlled by flow control valves 72a and 72b and electronic solenoid 64.

As illustrated in FIG. 6, all of the outlets from the first set of hydraulic cylinders 30a-30d, the second hydraulic cylinder 52 and, the third set of hydraulic cylinders 66a-66b feed into outlet pipe 74, which may be a 1 ¼" sch. 40 pipe. In outlet pipe 74 the liquid cleaning concentrates, liquid chemical additives and water join together in the predetermined amounts. That joining will inherently result in some mixing. However, for complete mixing of the cleaning solution it is desirable to have a mixer associated with outlet pipe 74. In FIG. 6 that is illustrated as stationary mixer 76 which may be a Chemineer Static Mixer stationary mixing tube of the type disclosed in U.S. Pat. Nos. 4,286,922, 3,942,765 and 4,314,974.

Finally, FIG. 6 schematically shows a coupling/-switch 20 of the type discussed previously with reference to FIG. 1. As mentioned outlet pipe 74 may be coupled to a delivery hose in order to convey the prepared cleaning solution to transfer vessels, or directly to the on-site individual usage dispenser, depending on the location of use of the mixing and metering station.

Figure 2:
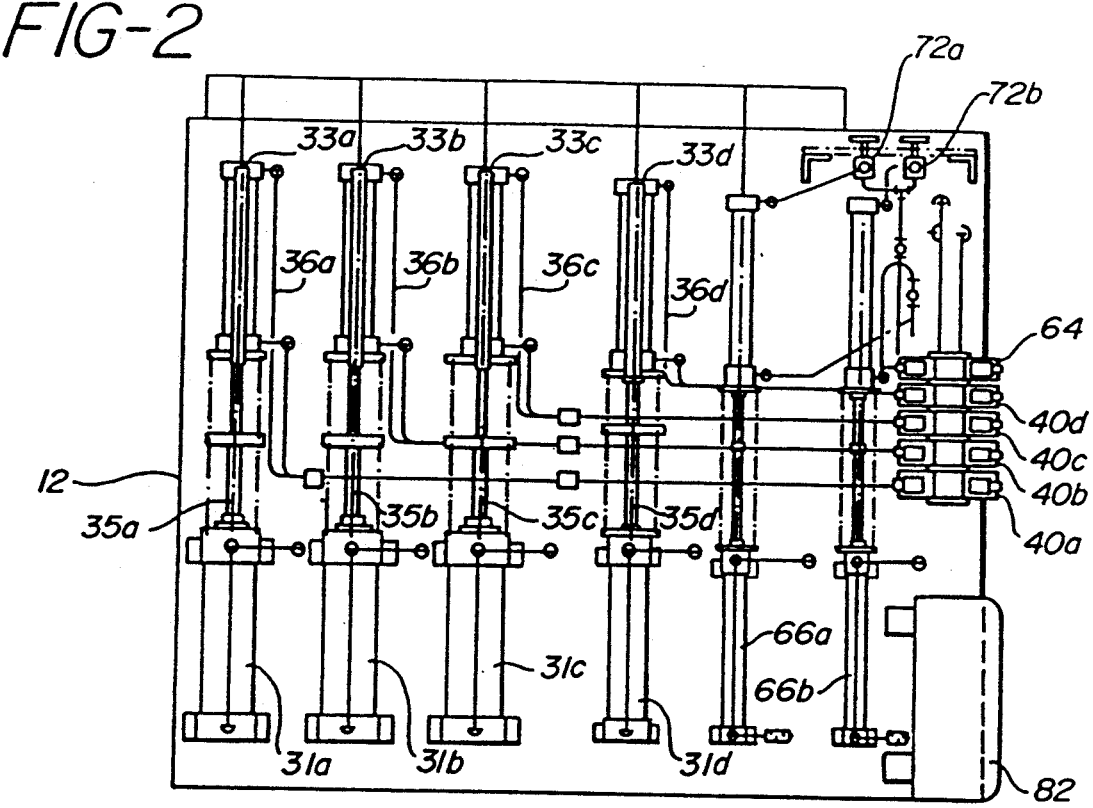
FIG. 2 is a top view of the mixing and metering station of the present invention.
Figure 3:
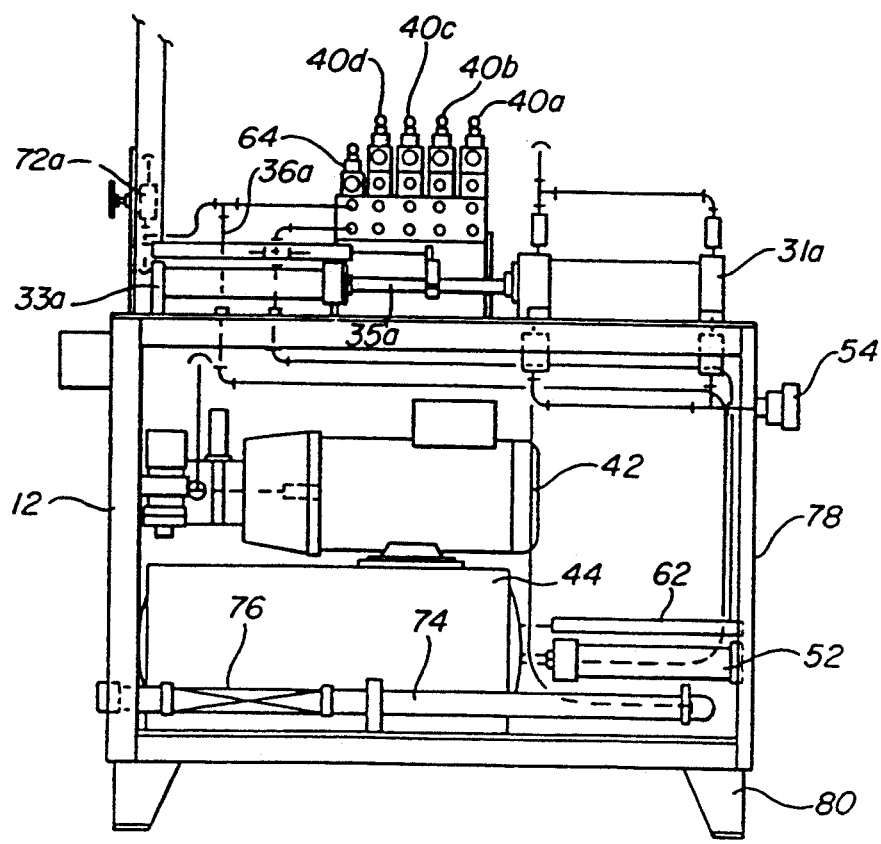
FIG. 3 is a partial side view of the mixing and metering station of the present invention.

As shown in FIGS. 3-5, mixing and metering station 12 is mounted on a frame 78 supported by legs 80 so that it can be moved, with for example a lift truck, from one area to another, placed on delivery truck 18, or otherwise transported to the desired location. Also shown on FIGS. 2 and 4-5 is electronic control panel 82 which is used to set potentiometers 36a-36d and 62, set and activate electronic solenoids 40a-40d and 64, turn on the electric motor 44, etc. Any number of known control mechanisms may be used with the mixing and metering station to provide the cleaning solution mixing and metering system of the present invention.

Having described the invention in detail and by reference to preferred embodiments thereof, it will be apparent that modification and variations are possible without departing from the scope of the invention defined in the appended claims.

What is claimed is:

1. A process for mixing, metering and delivering a number of different cleaning solutions from liquid bulk storage containers into a plurality of on-site individual usage dispensers, comprising the steps of:
   a) providing a portable mixing and metering station adapted for input to be connected to a plurality of liquid bulk storage containers containing different liquid cleaning concentrates, adapted to be connected to a source of water, and adapted to be connected to a liquid chemical additive tanks, said portable mixing and metering station being self contained and being mounted on a frame so that it can be transported to a desired location,
   b) connecting said mixing and metering station to a plurality of liquid bulk storage containers, a source of water, and liquid chemical additive tanks,
   c) metering a predetermined amount of water from said source onto a single outlet pipe with minimum air entrapped and metering predetermined amounts of said liquid cleaning concentrate from said containers and said chemical additive from said tanks to said single outlet pipe with minimum air entrapment,
   d) mixing simultaneously and under pressure, in said single outlet pipe of said mixing and metering station, said predetermined amounts of said liquid cleaning concentrate and said chemical additive with said water to form a cleaning solution,
   e) providing a plurality of on-site individual usage dispensers, and
   f) delivering said cleaning solution through said single outlet pipe into said plurality of on-site individual usage dispensers.

2. The process of claim 1 wherein said single outlet pipe has a single delivery hose connected thereto.

3. The process of claim 1 wherein said portable mixing and metering station is located on a delivery truck.

4. The process of claim 3 wherein said delivery truck also has thereon a plurality of said liquid bulk storage containers of liquid cleaning concentrate, said delivery truck also having thereon a plurality of said liquid chemical additive tanks.

5. The process of claim 4 wherein one of said liquid chemical additive tanks contains perfume and another of said liquid chemical additive tanks contains dye.

6. The process of claim 3 wherein a reeled delivery hose on said delivery truck is used to delivery said cleaning solution into said on-site individual usage dispensers.

7. The process of claim 1 wherein said mixing and metering station includes a first set of hydraulic cylinders which is controlled by potentiometer and solenoid operated flow control valves so as to predetermine the amounts of liquid cleaning concentrate conveyed to said outlet pipe.

8. The process of claim 7 wherein said mixing and metering station includes a second hydraulic cylinder which is controlled by a potentiometer so as to predetermine the amounts of water conveyed to said outlet pipe and further including a third set of hydraulic cylinders which is controlled by solenoid operated fluid control valves so as to predetermine the amounts of liquid chemical additive conveyed to said outlet pipe.

9. The process of claim 1 wherein said mixing is done by a stationary mixer.

10. The process of claim 1 wherein said water inlet, said cleaning concentrate inlets, and said liquid chemical additive inlets each include a quick connect coupling for easy connection and disconnection from the water source, the liquid bulk storage containers, and the liquid chemical additive tanks, respectively.

11. The system of claim 10 wherein each of said liquid cleaning concentrate inlets has two check valves and each of said liquid concentrate outlets has two check valves for continuous pumping of liquid cleaning concentrate.

12. The system of claim 10 wherein said water inlet has two check valves and said water outlet has two check valves for continuous pumping of water.

* * * * *